Patented Mar. 5, 1946

2,395,931

UNITED STATES PATENT OFFICE 2,395,931

METHOD OF DECOLORIZING HYDROCARBON OILS

William A. La Lande, Jr., Upper Darby, Pa., assignor to Porocel Corporation, Philadelphia, Pa., a corporation of Delaware No Drawing. Original application March 14, 1942, Serial No. 434,728. Divided and this application May 26, 1945, Serial No. 596,094

7 Claims. (Cl. 196—147)

The present invention relates to the preparation of adsorbent compositions, and more particularly to the production of water-insoluble metal aluminates suitable for use as decolorizing adsorbents and catalysts.

This application is a division of my copending application Serial Number 434,728, filed March 14, 1942, entitled "Metal aluminate adsorbents and method of using same."

An object of this invention is the preparation of adsorbent compositions by reacting in aqueous solution an alkali metal aluminate and a water-soluble salt of a metal capable of forming a water-insoluble metal aluminate, in the presence of a compound yielding ammonium ions (NH$_4$+) in aqueous solution.

It has been proposed heretofore to produce water-insoluble metal aluminates by reacting an alkali metal aluminate with a water-soluble salt of a metal capable of forming a water-insoluble aluminate. I have found that aluminates produced by such method possess relatively weak adsorptive properties, and that such aluminates were of little or no value as decolorizing agents or catalysts. However, I have discovered that by carrying out the process aforementioned in the presence of a compound yielding NH$_4$+ions in aqueous solution, or by treating the product of said process with a compound yielding NH$_4$+ions in aqueous solution, I am able to produce highly active adsorbents suitable for use as decolorizing agents or catalysts.

In accordance with my invention, an alkali metal aluminate is dispersed in sufficient water to dissolve the compound, and to this solution is added a second solution containing an ammonium salt and a salt of a metal capable of forming a water-insoluble metal aluminate. The mixture is then heated, preferably at its boiling point, for a period of time sufficient to complete the reaction, whereby there is produced a water-insoluble metal aluminate. The insoluble metal aluminate is then separated from the reaction mixture by suitable means, for example, by decantation, filtering or centrifuging, and the insoluble aluminate is then washed free of soluble salts, dried to a suitable volatile matter content, and reduced to particles of desired size. As an alternative procedure, the alkali metal aluminate may be reacted with the metal salt to form a water-insoluble metal aluminate, and the latter may then be treated with a compound capable of yielding ammonium ions in aqueous solution.

In carrying out my process, I may employ commercially available alkali metal aluminates such as Na$_2$Al$_2$O$_4$ or K$_2$Al$_2$O$_4$, or alkali metal aluminates produced by the treatment of bauxite or other highly aluminous minerals with alkali metal hydroxides, oxides, peroxides, or carbonates. For example, alkali metal aluminates produced by fusing bauxite with an alkali metal carbonate, or by treating bauxite with an alkali metal hydroxide solution at elevated temperatures may be satisfactorily employed. As compounds capable of furnishing ammonium ions (NH$_4$+) in aqueous solution, I may utilize, for example, ammonium chloride, ammonium sulfate, and ammonium nitrate. Insofar as the salts of metals capable of forming water-insoluble aluminates are concerned, I prefer to use the chlorides or sulfates of magnesium, calcium or aluminum, although soluble salts of other metals such as strontium, barium, lead, copper, cadmium, iron, chromium, cobalt, nickel, manganese, thorium, cerium, beryllium, molybdenum, tin, titanium, zirconium, tungsten, and vanadium may be employed. While chemically equivalent amounts of an ammonium compound and of a soluble metal salt may be used, based upon the amount of alkali metal aluminate employed, it is not necessary to do so in all cases as the completion of the reaction may be favored by having present an excess of one or more of the reactants, particularly the soluble metal salt.

The concentrations of the solutions employed may vary over a wide range, for example, from 1 per cent up to saturation at the boiling point of the solution or mixture of solutions. The temperature at which the reaction is carried out is preferably that which is necessary to maintain the solution or mixture of reactants at its boiling point, however, higher or lower temperatures may be utilized. In general, temperatures of from about 150° F. to about 400° F. are suitable, sufficient pressure being maintained upon the reaction mixture to prevent substantial loss of water therefrom. The reaction time will vary considerably, depending upon the quantities and concentrations of the reactants, the degree of agitation of the reaction mixture, and the temperature at which the reaction is carried out. In some cases the formation of the water-insoluble metal aluminate may be completed in a few hours, whereas in other cases the reaction may require 10 to 15 hours, or more. The water-insoluble metal aluminate, upon completion of the reaction, may be freed of soluble salts by washing with water, and then dried to a suitable volatile matter content (water content) prior to reduction of the aluminate to desired particle size. Depending upon the use to which the metal aluminate is to be put, the particle size and volatile matter content will vary.

The volatile content may range from about 10 per cent to about 30 per cent by weight, and is preferably of the order of 15 per cent to 20 per cent by weight. The particle size or mesh of the aluminate may be of the order of 20–60 mesh for the percolation decolorization of oils, or 4 to 60 mesh for the catalytic treatment of oil or other compounds, or finer than 100 mesh for the contact decolorization of oils or the catalytic conversion of hydrocarbons.

My invention may be further illustrated by the following examples, which, however, are not to be construed as limiting the scope thereof.

1. 204 parts by weight of $MgCl_2.6H_2O$ and 107 parts by weight of $NH_4Cl$ were dissolved in 1000 parts by weight of water, and the resulting solution was introduced into a reaction vessel provided with a stirrer and a reflux condenser. A second solution was made up consisting of 164 parts by weight of anhydrous $Na_2Al_2O_4$ and 1000 parts by weight of water, and this solution was added to the solution first mentioned, with vigorous stirring. The mixture was then boiled for 10 hours at about 212° F., the reflux condenser serving to prevent loss of water. As a result of the reaction between the magnesium chloride and the sodium aluminate, in the presence of the ammonium chloride, there was produced a white, insoluble precipitate comprising magnesium aluminate, which was filtered from the solution, washed free of soluble salts with water, and air dried. The adsorbent product so produced had a volatile content (water) of 36.1 per cent by weight, determined by heating a sample of it at 1800° F. for 20 minutes. The volume weight of the product (36.1 per cent volatile content) was 36.9 pounds per cubic foot.

The decolorizing efficiency of this material was determined by contacting it with a hydrocarbon lubricating oil stock having a Saybolt universal viscosity of 150 seconds at 210° F., an A. P. I. gravity of 25.5° and an O. D. color of 821. Upon completion of the contacting step, the adsorbent was filtered from the oil, and the color of the oil was measured. The results obtained are as follows:

|  | O. D. color |
|---|---|
| Lubricating oil stock | 821 |
| Contacted with 15% of adsorbent at 500° F. for 20 minutes | 243 |

By way of comparison, a magnesium aluminate was prepared according to the procedure of Example 1, with the exception that the ammonium chloride was omitted. The decolorizing efficiency was determined as in Example 1, with the following results.

|  | O. D. color |
|---|---|
| Lubricating oil stock | 821 |
| Contacted with 15% of adsorbent at 500° F. for 20 minutes | 328 |

2. 200 parts by weight of substantially anhydrous, finely divided bauxite was thoroughly mixed with 212 parts by weight of anhydrous $Na_2CO_3$, and the mixture was fused at a temperature of 2000° F. for a period of 4 hours. The resulting fusion product was cooled and reduced to a fine powder by grinding. 165 parts by weight of the powdered material was suspended in 200 parts by weight of water, and the mixture was charged to a reaction vessel provided with a stirrer and a reflux condenser. To this mixture was added a solution consisting of 408 parts by weight of $MgCl_2.6H_2O$, 214 parts by weight of $NH_4Cl$, and 750 parts by weight of water. The mixture was boiled, under a reflux condenser, for 10 hours with vigorous stirring. Upon completion of the heating period, the finely divided treated material comprising water-insoluble magnesium aluminate, was filtered from the solution, thoroughly washed with water to remove soluble salts, and then air dried. The magnesium aluminate so produced had a volatile content (water) of 32.0 per cent by weight, and a volume weight of 26.9 pounds per cubic foot.

The decolorizing efficiency of the adsorbent prepared as above described was determined by contacting the adsorbent with a lubricating oil stock such as was employed in Example 1. The results obtained are as follows:

|  | O. D. color |
|---|---|
| Lubricating oil stock | 821 |
| Contacted with 15% of adsorbent at 500° F. for 20 minutes | 226 |

By way of comparison, the above procedure was repeated with the exception that the ammonium chloride was omitted. The decolorizing efficiency of the resulting product was found to be as follows:

|  | O. D. color |
|---|---|
| Lubricating oil stock | 821 |
| Contacted with 15% of adsorbent at 500° F. for 20 minutes | 520 |

While, in the preparation of the adsorbents above described, I prefer to effect reaction of the components in aqueous solution by simply boiling the solution under a reflux condenser, I may dispense with the condenser and add water when necessary, or I may carry out the reaction under superatmospheric pressure, for example, in a reaction vessel at pressures up to several hundred pounds per square inch. The quantities and concentrations of the reaction components, as well as the reaction temperatures, may also be varied considerably from those shown in the examples.

The adsorbent compositions of the present invention may be regenerated or revivified after their adsorptive activity has decreased through the accumulation of carbonaceous materials during use, by treating such used adsorbents with a solvent or solvent mixture capable of dissolving or displacing the undesirable carbonaceous materials. For example, the used adsorbents may be washed with naphtha, alcohols, ketones, benzol, chlorinated hydrocarbon solvents, or mixtures thereof such as naphtha and acetone, in order to dissolve and remove adsorbed carbonaceous materials. Or, the used adsorbents, with or without preliminary washing or steaming, may be regenerated by heating, preferably in the presence of air, or gases containing controlled amounts of oxygen, in order to remove carbonaceous impurities.

I claim:

1. A method of decolorizing hydrocarbon oil, which comprises contacting said oil with a water-insoluble metal aluminate formed by the reaction in aqueous solution of an alkali metal aluminate and a water-soluble salt of a metal capable of forming a water-insoluble metal aluminate, in the presence of a compound yielding $NH_4+$ ions.

2. A method of decolorizing hydrocarbon oil, which comprises contacting said oil with a water-insoluble metal aluminate precipitated from aqueous solution in the presence of a compound yielding $NH_4+$ ions in aqueous solution.

3. A method of decolorizing hydrocarbon oil, which comprises contacting said oil with a water-insoluble magnesium aluminate precipitated from aqueous solution in the presence of a water-soluble ammonium compound.

4. A method of decolorizing hydrocarbon oil, which comprises contacting said oil with a water-insoluble metal aluminate, said aluminate having been formed by the reaction in aqueous solution of an alkali metal aluminate and a water-soluble salt of a metal capable of forming a water-insoluble metal aluminate, in the presence of a compound yielding $NH_4+$ ions, and thereafter washed with water and dried to a volatile matter content of from 10% to 30% by weight.

5. A method of decolorizing hydrocarbon oil, which comprises contacting said oil with a water-insoluble metal aluminate, said aluminate having been precipitated from aqueous solution in the presence of a compound yielding $NH_4+$ ions in aqueous solution and thereafter washed with water and dried to a volatile matter content of from 10 to 30% by weight.

6. A method of decolorizing hydrocarbon oil, which comprises contacting said oil with a water-insoluble magnesium aluminate, said aluminate having been precipitated from aqueous solution in the presence of a water-soluble ammonium compound, and thereafter washed with water and dried to a volatile matter content of from 10 to 30% by weight.

7. A method of decolorizing hydrocarbon oil, which comprises contacting said oil with a water insoluble magnesium aluminate, said aluminate having been precipitated from aqueous solution in the presence of ammonium chloride, and thereafter washed with water and dried to a volatile matter content of from 10 to 30% by weight.

WILLIAM A. LA LANDE, Jr.